United States Patent
Zemanek et al.

(10) Patent No.: US 12,196,031 B2
(45) Date of Patent: Jan. 14, 2025

(54) INSULATING AND SEALING SYSTEM FOR JOINTS OF JOINERY CONSTRUCTION ELEMENTS, ESPECIALLY WINDOWS AND EXTERIOR DOORS

(71) Applicant: Selena Labs Sp. z o.o., Dzierzoniów (PL)

(72) Inventors: Piotr Zemanek, Bielawa (PL); Katarzyna Klimentowska, Wysoka (PL); Jerzy Stoklosa, Skoczów (PL); Tomasz Pawlus, Pieszyce (PL); Michal Krzyzaniak, Wroclaw (PL)

(73) Assignee: Selena Industrial Technologies Sp. z o.o. (PL)

( * ) Notice: Subject to any disclaimer, the term of this patent is extended or adjusted under 35 U.S.C. 154(b) by 973 days.

(21) Appl. No.: 17/205,306

(22) Filed: Mar. 18, 2021

(65) Prior Publication Data
US 2021/0301584 A1    Sep. 30, 2021

(30) Foreign Application Priority Data
Mar. 26, 2020    (EP) .................................. 20166032

(51) Int. Cl.
*E04B 1/68* (2006.01)
*E06B 1/62* (2006.01)

(52) U.S. Cl.
CPC .............. *E06B 1/62* (2013.01); *E04B 1/6801* (2013.01); *E04B 1/6803* (2013.01)

(58) Field of Classification Search
CPC ........ E06B 1/62; E04B 1/6801; E04B 1/6803; F16J 15/02; F16J 15/022
See application file for complete search history.

(56) References Cited

U.S. PATENT DOCUMENTS 4,988,400 A * 1/1991 Rundo ................... F16J 15/108
156/247

FOREIGN PATENT DOCUMENTS

| DE | 19725705 A1 | 1/1999 |
| EP | 1672161 A1 | 6/2006 |
| EP | 3176195 A1 | 6/2017 |
| FR | 2045283 A5 | 2/1971 |
| GB | 2110282 A | 6/1983 |
| PL | 213303 B1 | 2/2013 |

OTHER PUBLICATIONS

European Search Report for Application No. EP20166032, dated Sep. 24, 2020, 5 pages.
Selena FM, S.A.: "Window & Door Product Catalogue", Jul. 5, 2018, pp. 77-97, XP055733434.

* cited by examiner

*Primary Examiner* — Gilbert Y Lee
(74) *Attorney, Agent, or Firm* — Lerner David LLP

(57) ABSTRACT

A sealing system for joints of joinery construction elements, especially windows and exit doors, includes an insulating material, an internal sealing layer disposed over an interior surface of the insulating material and an external sealing layer disposed over an exterior surface of the insulating material. The internal sealing layer has a low vapor permeability with an equivalent diffusion resistance factor (Sd) equal to or greater than 30 m, and the external sealing layer has a vapor permeability greater than the vapor permeability of the internal sealing layer with an equivalent diffusion resistance factor (Sd) not greater than 2 m.

14 Claims, 1 Drawing Sheet

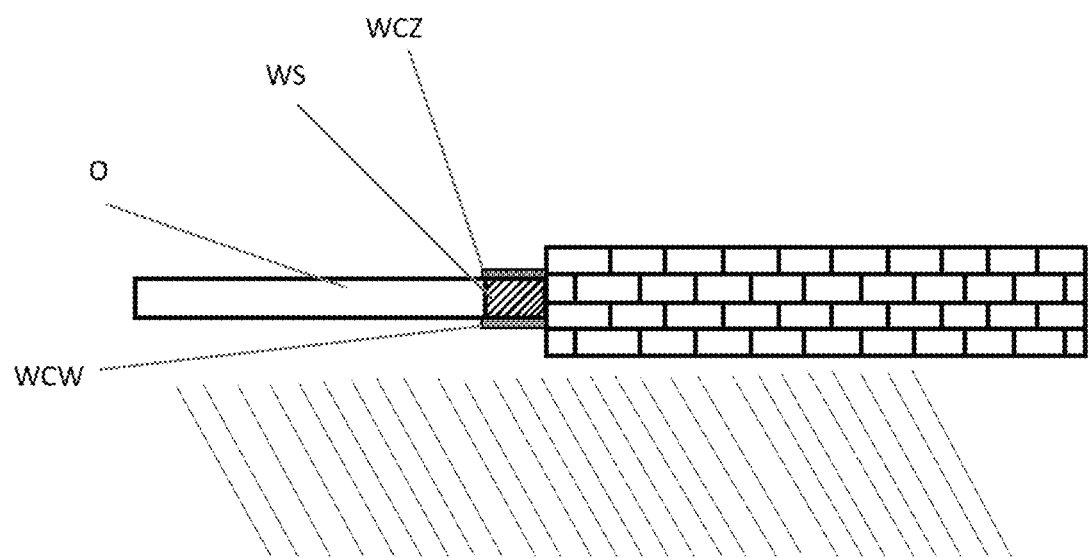

INSULATING AND SEALING SYSTEM FOR JOINTS OF JOINERY CONSTRUCTION ELEMENTS, ESPECIALLY WINDOWS AND EXTERIOR DOORS

CROSS-REFERENCE TO RELATED APPLICATIONS

The present application claims priority to European Application No. 20166032.1 filed Mar. 26, 2020, the disclosure of which is incorporated herein by reference.

BACKGROUND OF THE INVENTION

The invention relates to a joint for sealing and insulating joinery construction elements, especially windows and exterior doors, in the form of a sealing and insulating joint regulating the thermal and humidity-related performance of the entire joint between the reveal and the frame. The invention is used to insulate and at the same time to seal the joinery performing as a seal between the reveal and the window or door frame. The invention concerns the insulation and sealing for door and window frames as well as shutter cases in door and window openings in the building structure.

It is known to use polyurethane foams as window insulation. The common polyurethane foams are based on aromatic isocyanates, usually mixtures of isomers of variously substituted forms of TDI diisocyanate and mixtures of variously substituted MDI methyl diphenyl diisocyanates, while oligomers with hydroxyl groups at the ends, including polyesters or polyethers, are used as polyols.

The Polish patent n. 213303 provides a description of a one-component composition for the production of polyurethane foam containing a mixture of prepolymer, porophor and surfactant. As a prepolymer it contains free isocyanate groups in an amount that represents 12-17% by weight of the prepolymer produced by the reaction of a polyisocyanate with a mixture of polyols containing a first polyol, which is a triol with a molecular weight of 600-2500, and a second polyol, which is a diol, triol or their mixture with a molecular weight of 6000-10000, with the ratio of the first polyol to the second polyol being from 1:6 to 1:2 by weight. As a blowing agent it contains compounds selected from alkanes, ethers, ketones, alkyl carboxylates, halogenated hydrocarbons and their mixtures. The reaction product of poly(alkylosiloxane) and alkylene polythene is used as a surfactant, while alkylene oxide is ethylene oxide, propylene oxide or butylene oxide, in an amount of 0.5-4% by weight in relation to the total weight of the composition.

The patent description EP1 672 161 presents a sealant for the joints of construction elements that contains an insulating material in the internal area of the joint and a sealant in at least one front area of the joint edge. The insulating material consists of a single-component, moisture-cure flexible polymer foam, and a sealing material made of a vapor-diffusion-resistant sealant directly adjacent to the insulating material, where the sealant is a single-component and moisture-cure sealant and can be injected before curing. Its elasticity is basically the same as or greater than that of the insulating material.

According to DE 197 25 705, the joint between the reveal and the frame is insulated by means of mounting foam. Subsequently from the outside, a watertight finish of the joints of the construction element is carried out with an indefinite elastic material, which is applied to the mounting foam from the outside. The description of FR 2 045 283 presents a joint sealant in which the connection to the building structure is made by means of an internal insulation layer, which is made, for example, of synthetic cellulose material, and by means of a watertight and airtight external layer, which closes the internal layer on both sides.

GB 2 110 282 A presents a joint sealant in which the joint between the hinged door and the vehicle body is sealed on both external sides by means of a permanently elastic adhesive, with an optional filler strip in the middle of the joint seal made, for example, of a foam material.

However, better and more durable materials for insulating windows and exterior doors are still being sought, as well as systems regulating the flow of water vapor in the joint between the reveal and the frame and eliminating uncontrolled air infiltration. Those solutions would increase the energy and acoustic efficiency of the joint.

BRIEF SUMMARY OF THE INVENTION

The aim of the invention is therefore to develop and provide a material system for both insulating and sealing the joinery in construction, especially for windows and exit doors, which will regulate the flow of heat and moisture in the joint in a controlled way, while eliminating uncontrolled air infiltration, while being easy to apply.

According to the invention, the insulating and sealing system is meant to form a system with three layers: two front layers—one on the outside and one on the inside of the building—which together form sealing and setting layers, and one middle insulation layer located between the front layers in the area between the reveal and the frame. The front layers have been intentionally selected with different equivalent diffusion resistance factor Sd to ensure proper joint performance as described above. Thus, a system with three layers has been developed: external front layer+insulating middle layer+internal front layer.

The invention concerns an insulating and sealing system for joints of construction elements, which in the central area of the system contains an insulating material, and in the separated front areas—external and internal—sealing and setting material, together regulating the flow of heat and moisture and eliminating uncontrolled air infiltration. According to the invention, a 3-layer insulating and sealing joint system for insulating windows and exterior doors was developed. It comprises three main components: a polyurethane foam-based insulation material in the middle area, a low vapor permeability (towards vapor-tight) sealing material in the front area of the internal joint separating the interior of the building from the middle area of the joint, and a vapor-permeable sealing material in the external area of the joint separating the exterior of the building from the middle area of the joint. The front layers are made of liquid foils seals.

According to the invention, polyurethane foam and sealing compounds in the form of liquid foils were combined into a system regulating the flow of heat and moisture in the joint, eliminating uncontrolled air infiltration through the joint, which increases the thermal and acoustic efficiency of the joint and eliminates the possibility of biological degradation of the joint and the frame.

According to the invention, the system contains an insulating material based on polyurethane (PU) foam in the central, middle area of the joint, a low vapor permeability (towards vapor-tight) material in the internal front area, setting the system and sealing the material insulating the joint from the interior of the building and a vapor-permeable material in the external front area, setting the system and sealing the material insulating the joint from the exterior of the building, while both sealing layers form the front layers of the system.

DETAILED DESCRIPTION

The invention provides for the use of polyurethane foam in the central, middle area of the joint of the entire system, while for the front sealing layers that perform setting and sealing, and regulating the flow of heat and moisture, liquid foils can be used, which can be made on the basis of materials such as MS Polymer, silicone, acrylic and/or silicone dispersion, styrene-butadiene resin, polyurethane, silanized polyurethane, epoxy resin, bitumen, asphalt, caoutchouc, rubber, butylene compounds, polysulphide compounds, or silicate compounds. Importantly, the front layers are divided into an external front layer separating the joint's central area, insulated with a PU foam insulating material, from the exterior of the building and an internal front layer separating the joint's central area, insulated with the PU foam insulating material, from the interior of the building.

Front layers are sealing products with appropriately selected and developed values of the equivalent diffusion resistance factor Sd.

The external front layer separating the exterior of the building from the central area (PU foam) is a vapor-permeable layer with such an equivalent diffusion resistance factor as to allow for the evacuation from the joint of possible moisture caused by the partial pressure difference of the water vapor between the exterior and the interior of the building. It is a material with a properly selected composition to ensure a tight and durable yet diffusion-open joint between this external front layer and the middle joint area filled with PU foam insulating material.

The internal front layer separating the interior of the building from the central area of the joint (PU foam) is a low vapor-permeability (toward vapor-tight) layer with such an equivalent diffusion resistance factor as to regulate the water vapor diffusion rate to the joint resulting from the partial pressure difference of the water vapor between the exterior and the interior of the building. It is a material with a properly selected composition to ensure a tight and durable, yet vapor-tight joint between this internal front layer and the middle joint area filled with PU foam insulating material.

The central insulation area sealing in the front areas contains two different liquid foils—sealing compounds with different vapor barrier properties: an internal liquid foil and an external liquid foil. Both products harden by evaporation of water but constitute different chemical groups. In order to ensure the environmental sustainability of the product, the sealants used in its formula are completely free of organic solvents.

The product forming the external layer (in the external front area) is applied in the form of a liquid film, which means that after curing its elasticity is basically equal to or greater than that of the insulating material. The product that constitutes the internal layer (in the internal front area) is applied in the form of a liquid film having an elongation at break of at least 40% according to EN ISO 527.

Having carried out an analysis and in consideration of expert experience, it was found that the best results would be obtained if the external front layer is such that the equivalent diffusion resistance factor (Sd) is no greater than 2 m (i.e., it is a vapor-permeable layer), while for the internal front layer the Sd is greater than or equal to 30 m (i.e., it is a low vapor-permeability, towards vapor-tight, layer).

The whole system according to the invention is comprised of external liquid foil (in the front area on the side of the exterior of the building)+insulating layer of PU foam (middle layer of the joint)+internal liquid foil (in the front area on the side of the interior of the building), and as such constitutes a uniform system of water vapor flow regulation from the interior of the building to the exterior of the building. The flow of water vapor is created with an adequate difference in partial pressure of water vapor inside and outside the building. At the same time, such system is an effective barrier for uncontrolled air infiltration through the junction between the reveal and the frame. Moreover, it protects the joint from biological degradation and increases the thermal and acoustic efficiency of the joint.

External liquid foils (applied in the external front area) are based on a mixture of reactive acrylic and silicone dispersion, which has a low Sd factor, lower than or equal to 2.0 m, preferably lower than or equal to 1.5 m, and after curing it is highly resistant to temperature changes and UV radiation. The film dries and cures very quickly (twice as fast as a standard system of this type) and may be applied to surfaces with very high (even +80° C.) or very low (+5° C.) temperatures. After curing, it protects sealed elements from overheating. It is easy to apply and may be removed with water before curing. The application can be repaired with the same material even long after curing. Moreover, it is highly compatible with typical construction materials.

From the outside of the building (in the front area) the sealing is made with vapor-permeable and UV-resistant materials. Due to the use of vapor-permeable material from the outside, free diffusion of moisture from the central area of the joint to the exterior of the building is possible. This is particularly important when the partial pressure difference of water vapor between the interior and the exterior of the building increases the intensity of water vapor diffusion through the joint. Such situations especially occur in periods of increased relative humidity of the air outside—above 55%—or immediately after the completion of construction, when the relative humidity of the air in the building is high due to large amounts of technological water in the building structure. The external front seal made with a liquid vapor-permeable foil provides an easy way to remove excessive moisture from the middle area of the joint and prevents condensation of water in this area, i.e., in the polyurethane foam insulation (this helps to increase the durability of the foam's insulating properties).

The sealing compound used on the inside of the building (in the internal front area) is latex with a high Sd factor equal to or greater than 30 m, i.e., it is a low vapor-permeability (close to vapor-tight) product. The application of such sealant regulates excessive inflow of water vapor from the interior of the building to the middle area of the joint of insulated PU foam. This sealant changes color as it dries. It is easy to use and can be removed with water before curing. The application can be repaired with the same material even long after curing. After curing, the product is highly resistant due to the high proportion of PP fibers in its composition. It is highly compatible with typical construction materials.

In particular, butadiene-styrene resin is used as a base for the internal foil and an acrylic dispersion for the external one. The sealing compound used on the external side of the building (external front area) is based on a mixture of a reactive acrylic dispersion with a glazing temperature from 0° C. to −40° C., zinc oxide from 0.1% to 1.0%, silica from 0.5% to 2.0% and a silicone dispersion from 5.0% to 10%. The second sealing compound—the internal front area—is based on butadiene styrene latex with a glazing temperature of 0° C. to −20° C. with the addition of polypropylene fibers.

In the middle area of the joint polyurethane foam is used since it is a material with high thermal and acoustic insulation properties (heat conduction coefficient ≤0.036 W/mk, acoustic insulation min. 55 dB). The insulating material consists of a single-component, moisture-cure flexible polymer foam.

The polyurethane foam comprises an isocyanate component and a polyol premix containing a polyol component, a blowing agent, a surfactant, and a catalyst. It is characteristic that the polyol premix contains 1.3 butane diol in an amount of at least 0.5% by weight of the polyol premix.

Preferably the foam comprises as a catalyst: 2,2'-dimorpholinyldiethyl-ether, which in the composition favorably constitutes at least 3% by weight of the polyol premix.

Preferably the foam comprises a catalytic retardant of at least 0.1% by weight of the quantity of catalyst used.

Preferably the foam comprises a mixture of polyether of molecular weight 2000 and 700, which favorably constitutes at least 10% by weight of the polyol premixture.

Preferably the foam comprises a mixture of gases such as propane, isobutane and dimethyl ether as the blowing agent.

Preferably the foam comprises carbonates and/or acetates as a viscosity regulating additive.

Preferably the foam comprises tetrafluoroethane and/or difluoroethane. Preferably the foam comprises propylene carbonate.

The use of a 3-layer system allows for controlled thermal and humidity-related performance of the entire joint, i.e., control of the moisture flow through the joint in such a way as to ensure effective thermal and acoustic insulation of the joint. This prolongs the life and the durability of the properties of the entire joint, including the polyurethane foam used in the seal. Moreover, it simplifies the process and the execution of a durable and properly working seal and insulation of the joinery.

The elements included in the system are compatible with each other and with other construction materials such as PVC, metal, aluminum, wood, aerated concrete, silicate, construction ceramics, concrete, mortars, interior plasters, facade plaster, expanded polystyrene (EPS), and extruded polystyrene (XPS).

The requirement for the external front foil is such that the equivalent diffusion resistance factor Sd is not greater than 2 m, while for the internal front foil Sd is to be equal to or higher than 30 m [according to PN-EN ISO 12572:2004]: PN-EN 1504-2:2008 Products and systems for the protection and repair of concrete structures—Definitions, requirements, quality control and evaluation of conformity—Part 2: Surface protection systems for concrete; ETAG 004-2013—External Thermal Insulation Composite Systems with Rendering.

Other features:
  Water base, no solvents
  Reusable, extended product lifetime
  Resistance to mold and fungi Thanks to the use of a full system, the polyurethane foam retains its positive properties for a longer time (thermal conductivity ≤0.036 W/mk, sound insulation min. 55 dB).
  High resistance to UV rays
  Health and environment—no element of the system emits harmful substances
  Water cleaning
  Ease and comfort of application
  Simplicity of use The invention is shown in the following examples and in a drawing showing the scheme of a system placed in the space between the jamb of a window or a door frame.

Example 1

The scheme of the system is shown in FIG. 1. The diagonal series of lines at the bottom of the FIGURE represent the interior of a construction element of a building, such as, for example, a room in a flat. The system contains two front layers, internal front layer WCW and external front layer WCZ—with the insulating part in the middle being middle layer WS. The system is installed as a joint in the space between window or door frames 0 and the wall of the building.

The following components in the following proportions have been used to prepare an example of the window insulation system in the form of a seal as shown in Tables 1-3.

The composition of the polyurethane foam contains a known isocyanate component and a polyol component containing additional elements, together forming a polyol premix, as well as a gas mixture as a blowing component.

Being an isocyanate component, the composition contains polymeric MDI diphenylene diisocyanate in the amount of 390 grams. The exact qualitative and quantitative compositions of the polyol premix and the gas mixture are shown in Table 1 in six example variants of the invention.

The foam composition is obtained as follows: 390 grams of polymeric MDI—diphenylene methane diisocyanate—is added to an aerosol can with a dosing device. Subsequently, a polyol premix containing the elements shown in Table 1, for this particular example 290 grams total weight, is added to the can. Both components together form a polyurethane prepolymer. Then the can is closed using a known method, such as gun valve or manual application gun. Gases under pressure in the liquid phase are injected through the valve. Their quantitative and qualitative composition is shown in Table 1.

The external front seal WCZ is prepared from the components indicated in Table 2.

The product is created in four stages. In the first stage the dispersion part is homogenized. The content of the fundamental acrylic part must not be less than 36%. This dispersion is combined with at least 3% of a silicone dispersion and liquid silica, preferably Nouryon Levasil CC. According to Table 2, to this homogeneous dispersion system a filler is added. After the filler materials have been added, it is necessary to check the degree of dilution. When the filler materials are diluted, a curing agent is added with caution. If the curing agent is zinc oxide, it is necessary to control the degree of dilution at this stage. If the curing agent is polycarbamide, it is important to ensure its full homogenization in the system. The last step consists of adding a material to protect the system biologically, such as a fungicide, as the product may be exposed to biological corrosive agents.

The internal front seal WCW is prepared from the components indicated in Table 3.

The product is created in four stages. In the first stage the dispersion is homogenized, if necessary. It is important to ensure that the dispersion is not less than 50% of the system. The next stage consists of adding liquid additives responsible for the final application parameters. At this stage a rheology modifier is added. The rheology modifier Aquaflow XLS 525 from Ashland is an optimal one. In the third stage the filler materials are added in the order shown in Table 3. After the filler materials have been added, it is necessary to check the degree of dilution. The last filler material is black iron oxide. At this stage it is particularly important to control the full homogenization of the system. After having diluted the fillers in stage four, fibers are added with caution. Their quantity must not be less than 0.3%.

The preparation of the final product, an example of a window insulation system, will be described below. The sealing system is applied in the space between the reveal and the frames of windows or doors during the joinery assembly.

Front layers extend the life and durability of the properties of the polyurethane foam used in the central area of the system. The products that constitute the system are compatible with other construction materials such as PVC, metal, aluminum, wood, aerated concrete, silicate, construction ceramics, concrete, expanded clay aggregate, mortars, interior plasters, facade plaster, expanded polystyrene (EPS), and extruded polystyrene (XPS).

The example system is prepared according to the following procedures/activities using the above-mentioned components.

In the middle area of the fissure (window/door) between the frame and the reveal. the polyurethane foam is applied since it is a material with high thermal and acoustic insulation properties (heat conduction coefficient ≤0.036 W/mk, acoustic insulation min. 55 dB).

After fully curing, the foam is cut off and the window foils, i.e., films in liquid form, are put on top of it to form the front layers so that they cover the whole polyurethane foam and overlap both the window frame and reveal (also the anchor plates). In order to protect the window frame from getting dirty, it is possible to cover it with masking tape.

From the inside (in the internal front area), the foam is covered with a low vapor-permeability film (toward vapor-tight) liquid foil. This material should constitute an adequate barrier for water vapor, so that it does not penetrate uncontrolled into the sealed middle area (PU foam) and does not liquefy. The coating is applied evenly using a special flexible spatula or wall paint brush. In vertical fissures it should be applied starting from the bottom of the window, moving the applicator upwards. The thickness of the coating immediately after application, while still wet, should be a minimum of 2 mm. If necessary, several layers can be applied, depending on the porosity of the substrate and conditions (provided the recommended thickness is maintained). In the case of a product (PU foam) wrapped in a film, a special squeeze dispenser for film-wrapped products must be used to apply the coating. If necessary, the frame should be protected with masking tape, which can be removed after the application of the liquid foil. The tools should be cleaned with water immediately after the application process.

From the outside (in the front area), the foam is covered with a vapor-permeable and UV-resistant liquid foil. Due to the use of a vapor-permeable material on the external front side, free diffusion of moisture from the central area of the joint to the exterior of the building is possible. This ensures that any condensation in the middle area of the joint is avoided.

This is particularly important when the partial pressure difference of water vapor between the interior and the exterior of the building increases the intensity of water vapor diffusion through the joint. Such situations occur especially in periods of increased relative humidity of the air outside—above 55%—or immediately after the completion of construction, when the relative humidity of the air in the building is high due to large amounts of technological water in the building structure. The external front seal made with a liquid vapor-permeable foil provides an easy way to remove excessive moisture from the middle area of the joint and prevents the condensation of water in this area, i.e., in the polyurethane foam insulation (this helps to increase the durability of the foam's insulating properties).

The coating is applied evenly using a special flexible spatula or wall paint brush. In vertical fissures it should be applied starting from the bottom of the window, moving the applicator upwards. The thickness of the coating immediately after the application, while still wet, should be about 1 mm. If necessary, several layers can be applied, depending on the porosity of the substrate and conditions (provided the recommended thickness is maintained). In the case of a product (PU foam) wrapped in a film, a special squeeze dispenser for film-wrapped products must be used to apply the coating. The masking tape is removed and the tools are cleaned with water immediately after the application.

TABLE 1

Examples of insulating materials used in the middle area

| Component (in grams) | Example no 1 | Example no 2 | Example no 3 | Example no 4 | Example no 5 | Example no 6 |
|---|---|---|---|---|---|---|
| Polyol premix ingredients | | | | | | |
| polyether triol mw 1000 | 32 | 32 | 32 | 32 | 32 | 32 |
| polyether triol mw 380 | 5 | 5 | 5 | 5 | 5 | 5 |
| polyether triol mw 700 | 5 | 5 | 5 | 5 | 5 | 5 |
| polyether diol mw 2000 | 8 | 8 | 8 | 8 | 8 | 8 |
| Tris(2-chloroethyl) phosphate | 15.5 | 15.5 | 15.5 | 15.5 | 15.5 | 15.5 |
| Chlorinated paraffin, e.g., type 45 | 17.7 | 15.2 | 13.2 | 17.7 | 17.5 | 17 |
| 1.3 butane diol | 0.5 | 3 | 5 | 0.5 | 0.5 | 0.5 |
| Silicone surfactant | 8 | 8 | 8 | 8 | 8 | 8 |
| 2,2'-di-morpholinyl-diethylether | 4 | 4 | 4 | 4 | 4 | 4 |

TABLE 1-continued

Examples of insulating materials used in the middle area

| Component (in grams) | Example no 1 | Example no 2 | Example no 3 | Example no 4 | Example no 5 | Example no 6 |
|---|---|---|---|---|---|---|
| Catalytic retarder-polymeric acid, e.g., BA 100 | 0.3 | 0.3 | 0.3 | 0.1 | 0.5 | 1 |
| Propylene carbonate | 4 | 4 | 4 | 4 | 4 | 4 |
| Total content of polyol premix in grams and as % of premixture | 290-100% | 290-100% | 290-100% | 290-100% | 290-100% | 290-100% |
| Gas component | | | | | | |
| Mixture 30/70 propane/isobutane | 102 | 102 | 102 | 102 | 102 | 102 |
| Gas R152a grams | 30 | 30 | 30 | 30 | 0 | 0 |
| Dimethyl ether DME | 44 | 44 | 44 | 44 | 74 | 74 |
| Isocyanate component | | | | | | |
| MDI | 390 | 390 | 390 | 390 | 390 | 390 |
| Total composition content in grams | 856 | 856 | 856 | 856 | 856 | 856 |

TABLE 2

Examples of sealant formula with an Sd factor less than 2.0 m (external front sealant layer)

| Category of raw materials | Raw material | Example ET1 | Example ET2 | Example ET3 | Example ET4 |
|---|---|---|---|---|---|
| Dispersion | Acrylic dispersion | 40.0 | 42.0 | 40.0 | 36.0 |
| | Silicone dispersion | 5.0 | 3.0 | 4.0 | 8.0 |
| | Liquid silica | — | 2.0 | 3.0 | 3.0 |
| Filler | Chalk | 42.8 | 41.3 | 41.8 | 41.8 |
| | Titanium white | 8.0 | 8.0 | 8.0 | 8.0 |
| | Pyrogenic silica | 2.0 | 2.0 | 2.0 | 2.0 |
| | Glass beads | 1.0 | 0.5 | — | — |
| Curing agent | Zinc oxide | 0.4 | 0.4 | — | 0.2 |
| | Polycarbamide | — | — | 0.4 | 0.2 |
| Biological protection | Fungicide | 0.8 | 0.8 | 0.8 | 0.8 |

TABLE 3

Examples of sealant formula with an Sd factor equal to or greater than 30.0 m (internal front sealant layer)

| Category of raw materials | Raw material | Example IT1 | Example IT2 | Example IT3 | Example IT4 |
|---|---|---|---|---|---|
| Dispersion | Styrene-butadiene dispersion | 50.0 | 60.0 | 55.0 | 50.0 |
| | Acrylic dispersion | 10.0 | — | — | — |
| | Additives | 3.2 | 3.2 | 3.2 | 3.2 |
| Filler | Chalk | 24.0 | 24.0 | 24.0 | 34.0 |
| | Bentonite | 2.0 | 2.0 | 2.0 | 2.0 |
| | Sand | 10.0 | 10.0 | 15.0 | 10.0 |
| | Iron oxide | 0.5 | 0.5 | 0.5 | 0.5 |
| Others | Fibers | 0.3 | 0.3 | 0.3 | 0.3 |

Example 2

Performance Tests of the Invention System

The expected results of the invention, i.e., proper, durable and effective working of the joint between the frame and the jamb were measured based on the standards presented in Table 2C.

The following results have been achieved and are presented in Table 2C. These results prove that a 3-layer system of compatible sealing and insulating materials with the parameters specified in the description, among others:

Internal liquid foil Sd ≥30 m
Foam PU λ≤0.036
External liquid foil Sd ≥2 m ensures proper controlled thermal and humidity-related performance of the entire joint, i.e., control of the moisture flow through the joint and elimination of uncontrolled air infiltration through the joint. This increases the thermal and acoustic efficiency of the joint and ultimately reduces the carbon footprint of the entire building.

The properties of the front sealants are presented in Tables 2A and 2B. The results in Table 2C indicate that the system meets the conditions for energy-saving buildings in the direction of passive buildings.

TABLE 2A

Key properties of the external front sealant formulas presented in the examples.

| External sealant | Elongation at break [%] | Full curing time 1 mm [min] | Curing rate/ 24 h [mm] | Sd factor [m] |
|---|---|---|---|---|
| ET 1 | 700 | 25 | 1.8 | 1.9 |
| ET 2 | 650 | 30 | 1.6 | 1.9 |
| ET 3 | 740 | 40 | 2.0 | 1.7 |
| ET 4 | 800 | 30 | 1.2 | 1.2 |

TABLE 2B

Key properties of the internal front sealant formulas presented in the examples.

| Internal sealant | Elongation at break [%] | Full curing time 1 mm [min] | Curing rate/ 24 h [mm] | Sd factor [m] |
|---|---|---|---|---|
| IT 1 | 320 | 45 | 1.4 | 30 |
| IT 2 | 280 | 40 | 2.0 | 38 |
| IT 3 | 260 | 38 | 1.6 | 34 |
| IT 4 | 180 | 30 | 1.4 | 31 |

This system combines ease of use with the beneficial properties of the executed joint such as:

TABLE 2C

| Property | Value | Standard |
|---|---|---|
| Rainwater resistance | pressure ≤ 600 Pa | PN-EN 1027 |
| Rainwater resistance | class 9A | PN-EN 12208 |
| Air permeability: | pressure ≤ 600 Pa | PN-EN 12207 |
| Air permeability: | class 4 | PN-EN 12207 |
| Air permeability: | $Q_L$ ≤ 0.46 m$^3$/hm | PN-EN 12207 |
| Air permeability: | a ≤ 0.1 [m$^3$/hm(daPa)$^{2/3}$] | DIN 4108-2 |

The invention constitutes a compatible 3-layer system for insulating and sealing the joints between the jambs and the frames of windows and doors. It ensures controlled thermal and humidity-related performance of the joint by means of appropriately selected Sd factors, i.e., controlled and limited moisture flow in the joint, and eliminates uncontrolled air infiltration through the joint. This increases the thermal and acoustic efficiency of the joints and ultimately reduces the carbon footprint of the entire building.

The invention claimed is:

1. A sealing system for joints between a building and construction elements of the building, the building having an interior and an exterior, the sealing system comprising:
    an insulating material comprising a polyurethane foam disposed between the building and a construction element of the building, the insulating material having an interior surface facing the interior of the building and an exterior surface facing the exterior of the building;
    an internal sealing layer disposed over the interior surface of the insulating material, the internal sealing layer having low vapor permeability; and
    an external sealing layer disposed over the exterior surface of the insulating material, the external sealing layer having a greater vapor permeability than the internal sealing layer,
    wherein the internal sealing layer has an equivalent diffusion resistance factor (Sd) equal to or greater than 30 m, and the external sealing layer has an equivalent diffusion resistance factor (Sd) not greater than 2 m,
    wherein the internal sealing layer and the external sealing layer are each formed by liquid films,
    wherein the elasticity of the external sealing layer after curing is equal to or greater than the elasticity of the insulating material and includes a mixture of a reactive acrylic dispersion having a glazing temperature between 0° C. and 40° C., between 0.1 wt % and 1.0 wt % of zinc oxide, between 0.5 wt % and 2.0 wt % of silica, and between 5.0 wt % and 10 wt % of a silicone dispersion, and the elongation at break of the liquid film of the internal sealing layer is at least 40% according to EN ISO 527, and
    wherein the internal sealing layer includes a mixture of butadiene styrene latex having a glazing temperature of between 0° C. and 20° C. and polypropylene fibers.

2. The sealing system as claimed in claim 1, wherein the polyurethane foam has a heat conduction coefficient ≤0.036 W/mk and provides acoustic insulation of at least 55 dB.

3. The sealing system as claimed in claim 1, wherein the polyurethane foam includes an isocyanate component and a polyol premix including a polyol component, a blowing agent, a surfactant, and a catalyst.

4. The sealing system as claimed in claim 3, wherein the polyol premix includes at least 0.5 wt % of 1.3 butane diol.

5. The sealing system as claimed in claim 3, wherein at least 3 wt % of the polyol premix is a 2,2'-dimorpholinyldiethyl-ether catalyst.

6. The sealing system as claimed in claim 3, wherein the polyol premix includes a predetermined percentage of the catalyst, and the polyol premix includes a catalytic retardant in an amount of 0.1 wt % of the predetermined percentage.

7. The sealing system as claimed in claim 3, wherein the polyol premix includes at least 10 wt % of a mixture of polyether having a molecular weight of 2000 and polyether having a molecular weight of 700.

8. The sealing system as claimed in claim 3, wherein the blowing agent is selected from the group consisting of propane, isobutane, dimethyl ether and mixtures thereof.

9. The sealing system as claimed in claim 3, wherein the polyurethane foam includes carbonates and/or acetates as a viscosity regulating additive.

10. The sealing system as claimed in claim 3, wherein the polyurethane foam includes tetrafluoroethane, difluoroethane and/or propylene carbonate.

11. The sealing system as claimed in claim 1, wherein the internal sealing layer and the external sealing layer are each formed from liquid films, the elasticity of the external sealing layer after curing is equal to or greater than the elasticity of the insulating material, and the elongation at break of the internal sealing layer after curing is at least 40% according to EN ISO 527.

12. The sealing system as claimed in claim 1, wherein the internal sealing layer includes styrene-butadiene resin, and the external sealing layer includes an acrylic and/or silicone dispersion.

13. The sealing system as claimed in claim 1, wherein the interior sealing layer separates the insulating material from the interior of the building and the exterior sealing layer separates the insulating material from the exterior of the building.

14. The sealing system as claimed in claim 1, wherein the interior sealing layer overlaps both an interior surface of the building and an interior surface of the construction element, and the exterior sealing layer overlaps both an exterior surface of the building and an exterior surface of the construction element.

* * * * *